Patented Jan. 19, 1926.

1,570,584

UNITED STATES PATENT OFFICE.

CARLETON ELLIS, OF MONTCLAIR, NEW JERSEY, ASSIGNOR TO ELLIS-FOSTER CO., A CORPORATION OF NEW JERSEY.

CUMARON RESIN COMPOSITION AND PROCESS OF MAKING SAME.

No Drawing.   Application filed November 12, 1917.   Serial No. 201,473.

*To all whom it may concern:*

Be it known that I, CARLETON ELLIS, a citizen of the United States, and a resident of Montclair, in the county of Essex and State of New Jersey, have invented certain new and useful Improvements in Cumaron Resin Compositions and Processes of Making Same, of which the following is a specification.

This invention relates to cumaron resin compositions and to processes of making same, and relates especially to the utilization of impure cumaron resin containing acid bodies or bodies of a saponifiable character.

Pure cumaron resin is practically alkali resistant, being substantially unsaponifiable in the ordinary sense of the word, but when made by polymerization with sulphuric acid, as for example, when obtained by the washing of benzol, toluol, solvent naphtha and the like, with sulphuric acid to polymerize these hydrocarbons, the conditions may be such as to produce cumaron resin associated with acid bodies, for example the sulphonic acid or similar acid of some of the reactive bodies present, or of the resin itself yielding a product having an acid number or saponification value of perhaps several per cent.

Such composite resin containing acid bodies or saponifiable substances may be used in the arts in various ways, as for example, in the coating of concrete or production of stains or paints for staining concrete or stone and similar structural materials or for protecting structural steel. The resin may be used in making lacquers, bronzing liquids, non-livering varnishes for pigments of a basic character and the like. It may be used in the preparation of chewing gum and as a coating for tin cans employed for canning edible materials. It may be employed as an ingredient of rubber, insulation and similar elastic compositions such as linoleum, or may be used to impregnate paper, to produce a waterproof product such as roofing paper and the like. Asbestos shingles may be produced with this material as a binder. It also may be used as an ingredient of printer's ink, and the like.

The degree of acidity or saponification value of the resinous composite will vary depending on conditions; but as a rule the softer resin has the higher saponification value. In one case a resin having an initial melting point of 58°–60° C. exhibited an acid number of about 30, while another sample having an initial melting point of 75°–77° C. had a saponification value of about 18.

In referring to a melting point it should be understood that the temperature mentioned is that at which the powdered resin or finely-divided resinous body agglomerates to a coherent mass without the resin necessarily becoming completely liquid. Owing to the gradations which take place in the melting of a resin, such an initial melting point or softening point is a satisfactory basis of expression.

Many samples of cumaron resin are not readily soluble in light petroleum hydrocarbons such as light gasoline, and by fractional precipitation, products may be obtained of differing melting point. For example a resin having a softening point of 75° on melting and dissolving in light gasoline, gave on cooling a precipitate of resinous material which melted at 82, while the resin soluble in the cold light gasoline melted at 47. The insoluble portion of the resin was considerably darker in color than the soluble.

By such fractional precipitation a product may be obtained having a lower acid number than the original resin.

The acid resins may be treated with a neutralizing agent such as soda, lime, magnesia, zinc oxide and the like, for example, the resinous composite may be fused with hydrated lime to yield a neutral product. Resin having a melting point of 75° C. was heated with 5% of hydrated lime to 200° C. and the initial melting point was thereby raised to 98° C. In another case the resin was heated to 170° C., the melting point of the resulting resinous material being 88°–89° C.

These resins containing the acid sulphonic bodies or similar impurities may be dissolved in a solvent such as benzol or a mixture of benzine or painters' naphtha, or other similar solvent material and used as a coating composition. A lime treated product as indicated above may be dissolved in a suitable solvent and applied to concrete floor to yield a concrete finish. A varnish material of cumaron resin or other resin of a substantially unsaponifiable character but containing sulphonic acid bodies or other acid material or saponifiable substances with or without the presence of lime or other base in combination largely or wholly with such acid substances is advantageous for many purposes.

In a similar manner solutions may be made for bronzing consisting of the acid-containing resin, or one which has been neutralized by fusion with lime or other alkali material, dissolved in a suitable solvent such as benzol, toluol, solvent naphtha and the like may be employed. Solutions ranging from 10 to 50 per cent may be thus prepared. The resin may be mixed with oil such as raw or boiled linseed oil, Chinese wood oil, or turpentine oil etc. to produce paints and varnishes. A varnish may be made from a resin of this character incorporated with copal resin in approximately equal parts, suitably thinned, with oil and a thinning solvent such as benzine preferably containing some aromatic hydrocarbon as benzol or toluol.

The coating composition may be applied to, for example, concrete by means of a brush or spray and may be applied to plastered walls and other structural substances; structural steel and the like.

What I claim is:—

1. A process which comprises the step of treating cumaron resin containing acid bodies, with a basic neutralizing agent in the absence of sufficient water to dissolve such basic material, in combination with the step of heating such resin to above its melting point.

2. A process which comprises the step of treating cumaron resin containing acid bodies with lime in the absence of enough water to dissolve the lime, in combination with the step of heating such resin to at least melting point.

3. A process of treating cumaron resin having an acid value substantially above that of pure polymerized cumaron, which comprises melting such resin to a liquid form in admixture with a basic calcium compound.

4. A process which comprises reacting on molten cumaron resin containing sulfonic acid bodies, in the absence of large quantities of solvents therefor, with alkali, to neutralize the acidity.

5. A non-acid resinous material containing cumaron resin and non-acid calcium salts of sulfonic acid compounds.

CARLETON ELLIS.